(12) United States Patent
Liang et al.

(10) Patent No.: US 11,835,980 B2
(45) Date of Patent: *Dec. 5, 2023

(54) METHODS RELATED TO CONTROLLING SWITCHES

(71) Applicant: SKYWORKS SOLUTIONS, INC., Irvine, CA (US)

(72) Inventors: Bang Li Liang, Ottawa (CA); Peter Harris Robert Popplewell, Ottawa (CA); Gregory Edward Babcock, Ottawa (CA)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,376

(22) Filed: May 10, 2022

(65) Prior Publication Data
US 2022/0350358 A1 Nov. 3, 2022

Related U.S. Application Data

(60) Continuation of application No. 16/950,772, filed on Nov. 17, 2020, now Pat. No. 11,327,517, which is a division of application No. 15/445,764, filed on Feb. 28, 2017, now Pat. No. 10,838,446.

(60) Provisional application No. 62/301,445, filed on Feb. 29, 2016.

(51) Int. Cl.
*G05F 1/595* (2006.01)
*G05F 1/46* (2006.01)
*H04B 1/44* (2006.01)

(52) U.S. Cl.
CPC .............. *G05F 1/595* (2013.01); *G05F 1/468* (2013.01); *H04B 1/44* (2013.01)

(58) Field of Classification Search
CPC ... G05F 1/10; G05F 1/46; G05F 1/468; G05F 1/56; G05F 1/59; G05F 1/595; H04B 1/40; H04B 1/44; H04B 1/46; H04B 1/48; H04B 1/485
See application file for complete search history.

(56) References Cited

U.S. PATENT DOCUMENTS 8,923,784 B2 * 12/2014 Seshita .................... H04B 1/48
327/415

FOREIGN PATENT DOCUMENTS

EP 1361664 A1 * 11/2003 ............. G05F 1/565

* cited by examiner

*Primary Examiner* — Diana J. Cheng
(74) *Attorney, Agent, or Firm* — Chang & Hale LLP

(57) ABSTRACT

Methods related to controlling switches. In some embodiments, a method for controlling a radio-frequency switch can include providing or generating a control signal to allow generation of a plurality of reference levels by a regulator, or to allow the regulator to be in sleep mode. The method can further include operating the regulator based on the control signal to generate the plurality of reference voltage levels for operation of the radio-frequency switch, or to be in the sleep mode.

19 Claims, 13 Drawing Sheets

METHODS RELATED TO CONTROLLING SWITCHES

CROSS-REFERENCE TO RELATED APPLICATION(S)

This application is a continuation of U.S. application Ser. No. 16/950,772 filed Nov. 17, 2020, entitled CIRCUITS AND DEVICES RELATED TO SWITCH CONTROLLER, which is a divisional of U.S. application Ser. No. 15/445,764 filed Feb. 28, 2017, entitled LOW LEAKAGE CURRENT SWITCH CONTROLLER, which claims priority to and the benefit of the filing date of U.S. Provisional Application No. 62/301,445 filed Feb. 29, 2016, entitled LOW LEAKAGE CURRENT SWITCH CONTROLLER, the benefits of the filing dates of which are hereby claimed and the disclosures of which are hereby expressly incorporated by reference herein in their entirety.

BACKGROUND

Field

The present disclosure relates to controllers for radio-frequency switches.

Description of the Related Art

In radio-frequency applications, switches are utilized to route signals. For example, an amplified signal can be routed from a power amplifier to an antenna for transmission. In another example a signal received through an antenna can be routed to a low-noise amplifier for amplification.

SUMMARY

According to some implementations, the present disclosure relates to a controller for a radio-frequency switch. The controller includes a low-dropout regulator configured to generate a plurality of reference voltage levels for operation of a switch, or to be in a sleep mode to conserve power, based on a control signal received through a common input node. The controller further includes a mode detector in communication with the low-dropout regulator, and configured to provide a first form of the control signal to the common input node to allow the plurality of reference levels to be generated by the low-dropout regulator, or a second form of the control signal to the common input node to put the low-dropout regulator in the sleep mode.

In some embodiments, the low-dropout regulator can be substantially free of a dedicated power down pin, separate from the common input node, for receiving a power down signal to put the low-dropout regulator into the sleep mode. The common input node can be connected to an enable pin, and the first form of the control signal can be an enable signal. The second form of the control signal can be a disable signal that puts the low-dropout regulator in the sleep mode.

In some embodiments, the mode selector can be configured to be always alive when operation of the switch is possible.

In some embodiments, the controller can further include a low power bandgap circuit configured to provide a bandgap reference voltage to the low-dropout regulator. The low power bandgap circuit can be configured to be always alive when operation of the switch is possible.

In some embodiments, the low-dropout regulator can include an error amplifier configured to be controlled by the control signal from the mode detector, and to generate an output voltage Vout based on inputs including the bandgap reference voltage and a feedback voltage. The low-dropout regulator can further includes a first transistor having a gate controlled by the output voltage Vout from the error amplifier, and a source connected to a supply voltage. The low-dropout regulator can further include a second transistor having a gate controlled by the control signal from the mode detector, and a source connected to a drain of the first transistor. The low-dropout regulator can further include a plurality of source followers implemented in series with one end connected to a drain of the second transistor and the other end coupled to ground, such that a source of each of the source followers provides a respective reference voltage levels. The low-dropout regulator can further include a resistor feedback network configured to provide input voltage levels for the source followers. The resistor feedback network can be configured to share a single DC current path to achieve a low leakage current.

In some embodiments, the mode detector can includes a logic circuit that includes a plurality of NOT gates each configured to receive an input logic signal and generate an output, an AND gate having a plurality of inputs coupled to the outputs of the NOT gates and an output, and a downstream NOT gate having an input coupled to the output of the AND gate and an output for providing the control signal. The logic circuit can be configured such that the first form of the control signal at the output of the downstream NOT gate has a high logic value when at least one of the input logic signals has a high logic value. The logic circuit can be configured such that the second form of the control signal at the output of the downstream NOT gate has a low logic value when each of the input logic signals has a low logic value.

In some embodiments, the controller can further include a level clipper configured to receive a plurality of input signals and provide level clipped signals as the input logic signals for the logic circuit.

In some teachings, the present disclosure relates to a semiconductor die that includes a substrate and a switch assembly implemented on the substrate. The semiconductor die further includes a controller implemented on the substrate and configured to control operation of the switch assembly. The controller includes a low-dropout regulator configured to generate a plurality of reference voltage levels for the operation of the switch assembly, or to be in a sleep mode to conserve power, based on a control signal received through a common input node. The controller further includes a mode detector in communication with the low-dropout regulator, and configured to provide a first form of the control signal to the common input node to allow the plurality of reference levels to be generated by the low-dropout regulator, or a second form of the control signal to the common input node to put the low-dropout regulator in the sleep mode.

In some embodiments, the switch assembly can include a plurality of silicon-on-insulator devices.

In a number of implementations, the present disclosure relates to a radio-frequency module that includes a packaging substrate configured to receive a plurality of components, and a switching circuit implemented on the packaging substrate. The radio-frequency module further includes a control circuit implemented on the packaging substrate and configured to control operation of the switching circuit. The controller includes a low-dropout regulator configured to generate a plurality of reference voltage levels for the operation of the switching circuit, or to be in a sleep mode to conserve power, based on a control signal received through a common input node. The controller further includes a mode detector in communication with the low-dropout regulator, and configured to provide a first form of the control signal to the common input node to allow the plurality of reference levels to be generated by the low-dropout regulator, or a second form of the control signal to the common input node to put the low-dropout regulator in the sleep mode.

In some embodiments, the switching circuit can be implemented on a first semiconductor die and the controller can be implemented on a second semiconductor die. In some embodiments, the switching circuit can be implemented on a semiconductor die and the controller can also be implemented on the same semiconductor die.

In accordance with a number of implementations, the present disclosure relates to a radio-frequency switch architecture that includes an assembly of switches implemented to allow routing of signals, and a controller in communication with the assembly of switches and configured to control operation of the assembly of switches. The controller includes a low-dropout regulator configured to generate a plurality of reference voltage levels for the operation of the assembly of switches, or to be in a sleep mode to conserve power, based on a control signal received through a common input node. The controller further includes a mode detector in communication with the low-dropout regulator, and configured to provide a first form of the control signal to the common input node to allow the plurality of reference levels to be generated by the low-dropout regulator, or a second form of the control signal to the common input node to put the low-dropout regulator in the sleep mode.

In some embodiments, the assembly of switches can be configured to route wireless local area network signals.

In some implementations, the present disclosure relates to a wireless device that includes a transceiver configured to process signals, and an antenna in communication with the transceiver and configured to facilitate either or both of transmit operation and receive operation of the transceiver. The wireless device further includes a switching module coupled to the antenna and configured to selectively route one or more signals associated with the antenna. The switch module includes a switching circuit and a control circuit configured to control operation of the switching circuit. The controller includes a low-dropout regulator configured to generate a plurality of reference voltage levels for the operation of the switching circuit, or to be in a sleep mode to conserve power, based on a control signal received through a common input node. The controller further includes a mode detector in communication with the low-dropout regulator, and configured to provide a first form of the control signal to the common input node to allow the plurality of reference levels to be generated by the low-dropout regulator, or a second form of the control signal to the common input node to put the low-dropout regulator in the sleep mode.

In some embodiments, the one or more signals processed by the switching module can include a wireless local area network signal. In some embodiments, the wireless device can be configured to provide cellular communication functionality.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 5-1, 5-2 and 5-3 show an example controller architecture having one or more features as described herein.

DETAILED DESCRIPTION OF SOME EMBODIMENTS

The headings provided herein, if any, are for convenience only and do not necessarily affect the scope or meaning of the claimed invention.

Figure 1:
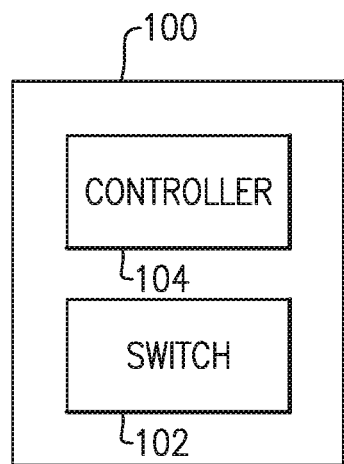
FIG. 1 depicts a block diagram of a switch system, architecture, and/or device having a switch and a controller.

FIG. 1 depicts a block diagram of a switch system, architecture, and/or device 100 having a switch 102 and a controller 104. As described herein, such a switch system/architecture/device can be configured to provide a number of desirable performance features, including low leakage current.

Figure 2:
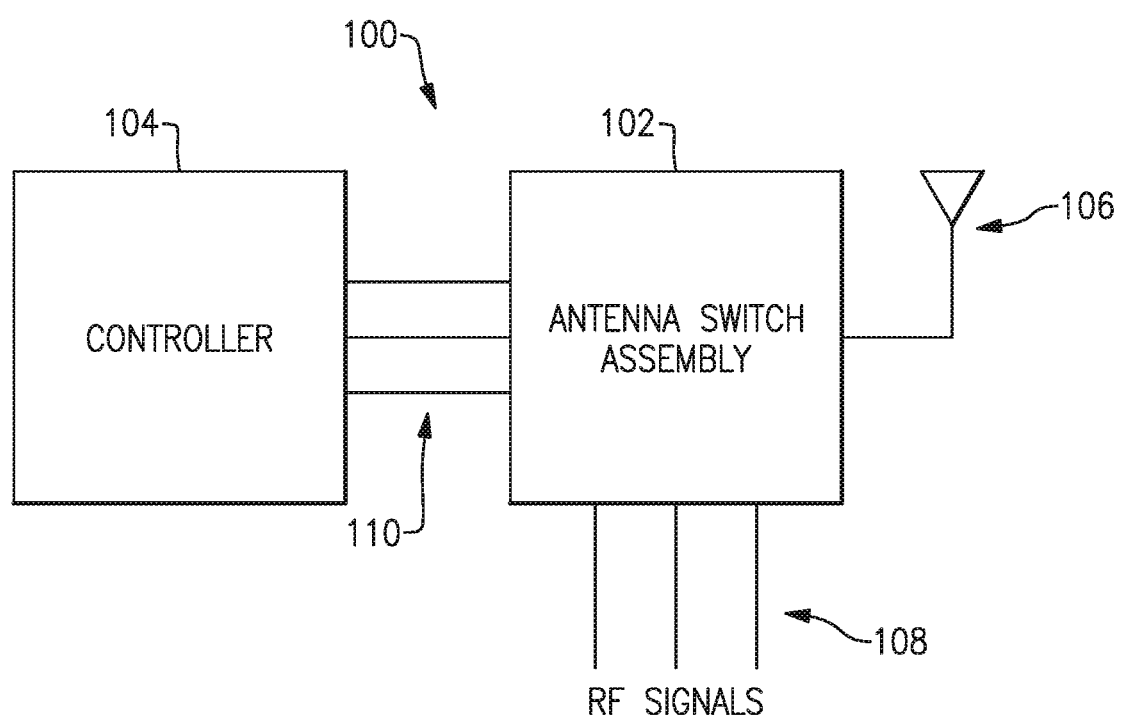
FIG. 2 shows an example switch architecture that can be a more specific example of FIG. 1.

FIG. 2 shows an example switch architecture 100 that can be a more specific example of FIG. 1. In the example of FIG. 2, an antenna switch assembly 102 can be implemented to allow routing of one or more radio-frequency (RF) signals 108 to and/or from an antenna 106 to facilitate various transmit (Tx) and/or receive (Rx) functionalities. In some embodiments, such an antenna switch assembly can be controlled by a controller 104 having one or more features as described herein. Such control functionalities can be facilitated by one or more control connections 110 between the controller 104 and the antenna switch assembly 102. Although various examples are described in such a context of antenna switching application, it will be understood that one or more features of the present disclosure can also be implemented in other switching applications.

Figure 3:
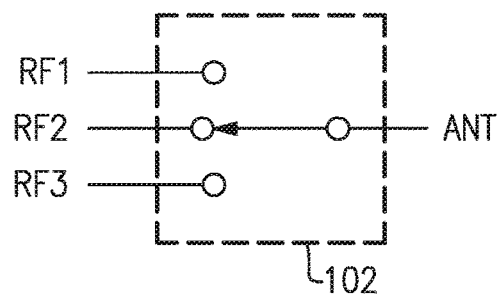
FIG. 3 shows an example of a switch assembly that can be implemented as the antenna switch assembly of FIG. 2.

FIG. 3 shows an example of a switch assembly 102 that can be implemented as the antenna switch assembly 102 of FIG. 2. In the example of FIG. 3, the switch assembly 102 is depicted as a single-pole-3-throw (SP3T) configuration having a pole connectable to an antenna (Ant), and each of three throws connectable to an RF signal path. Although such an example is described in the context of one pole and three throws, it will be understood that other numbers of pole(s) and/or throw(s) can also be implemented utilizing one or more features of the present disclosure.

Figure 4:
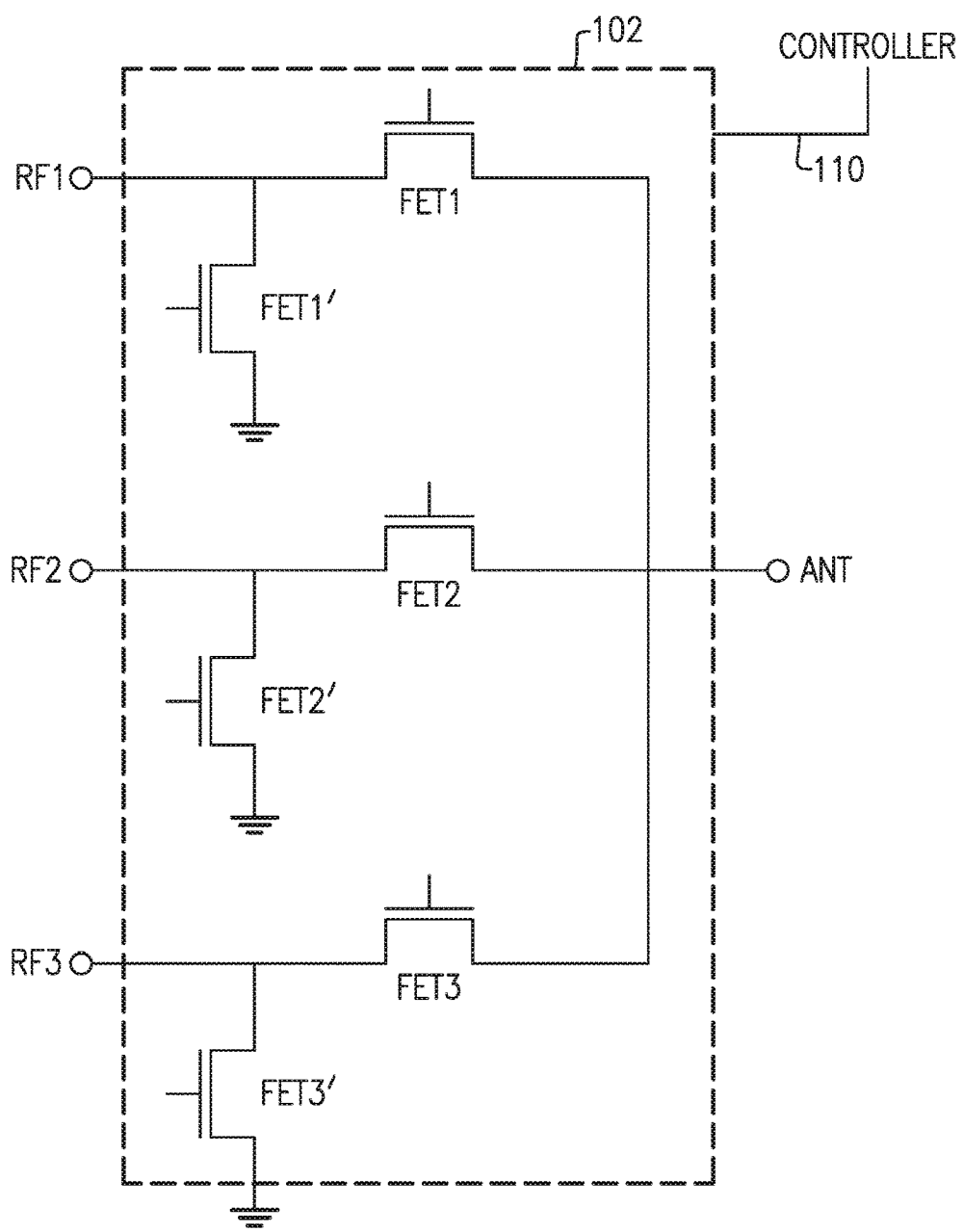
FIG. 4 shows an example switching assembly that can provide the example switching functionality of FIG. 3.

FIG. 4 shows an example switching assembly 102 that can provide the example SP3T functionality of FIG. 3. In FIG. 4, a first RF signal path node RF1 is shown to be coupled to an antenna node (Ant) through a first series switch (FET1); a second RF signal path node RF2 is shown to be coupled to the antenna node (Ant) through a second series (FET2); and a third RF signal path node RF3 is shown to be coupled to the antenna node (Ant) through a third series (FET3). One or more of such switching FETs can be operated to allow passage of corresponding RF signal(s) between the RF signal path node(s) and the antenna node (Ant).

In the example of FIG. 4, the first RF signal path node RF1 can be coupled to ground through a first shunt switch FET1'. Similarly, each of the second and third RF signal path node (RF2, RF3) can be coupled to ground through a corresponding shunt switch (FET2', FET3'). Such switchable shunt paths associated the series switches can provide desirable functionalities such as improved isolation.

For example, if it is desired to have only the first RF signal to be routed between the first signal path node RF1 and the antenna node (Ant), the first FET1 can be turned ON, the first shunt switch FET1' can be turned OFF, each of the second and third series switches FET2, FET3 can be turned OFF, and each of the second and third shunt switches FET2', FET3' can be turned ON.

In some embodiments, some or all of the series switches and the shunt switches in the example of FIG. 4 can be implemented as silicon-on-insulator (SOI) switches. It will be understood that one or more features of the present disclosure can also be implemented with other types of RF switches.

In some embodiments, some or all of the series switches and the shunt switches in the example of FIG. 4 can be implemented in stacked configurations, in which a given switch includes a plurality of FET devices arranged in series to, for example, facilitate power handling capability. In such a stack of FET devices, a gate of each FET can be provided with a control voltage to turn the FET ON or OFF. In some embodiments, all of the gates of the FETs in the stack can be provided with a common control voltage. In some embodiments, the gates of the FETs in the stack can be provided with different control voltages.

In some embodiments, other part(s) of the FETs in the stack can be provided with bias voltage(s) to enhance performance of the corresponding switch. For example, either or both of body and substrate of each FET can be provided with respective bias voltage(s). In some embodiments, application of such bias voltage(s) can be controlled or facilitated by a controller having one or more features as described herein.

In some embodiments, a switching architecture such as the example of FIG. 2 can include performance features such as a very low leakage current (e.g., <1 µA sleep current) without use of an external power down pin. In some embodiments, such a switching architecture can be implemented in RF applications such as, for example, local area network (LAN).

In some embodiments, such a switching architecture can include other performance features such as fast switching (e.g., <500 nS), good insertion loss (IL) performance (e.g., ~0.5 dB), good isolation performance (e.g., >32 dB), and moderate power level (e.g., 30 dBm) handling capability. In some embodiments, such a switching architecture can be implemented with no external power down pin to accommodate applications in which such a power down pin may not be available due to, for example, limited die size (e.g., 0.7 mm by 0.7 mm) and/or fixed pinout configuration (e.g., 9-ball WLCSP package).

In some embodiments, such a switching architecture can also include other performance features such as very low leakage current (e.g., sleep mode current Idd<4 µA over PVT), and an ability to support a wide power supply range (e.g., VDD=2.7V to 5.5V). In some embodiments, such a power supply range can be met by a regulator.

In some embodiments, such a switching architecture can be configured to be compatible with, for example, 1.2V to 5V control logic level. To accommodate such a design, an internal clamping protection can be implemented on control pins.

In some embodiments, some or all of the foregoing features can be addressed by a controller having one or more of the following features. For example, a low-dropout (LDO) regulator can be configured to support a wide power supply range (e.g., VDD=2.7V to 5.5V), and such an LDO regulator can be further configured to be turned off in a sleep mode to save power and minimize or reduce the overall sleep mode current.

Since no external power down pin is available in some applications, the power down signal can be generated, for example, from one or more input control signals using a mode detector to power down the LDO regulator in the sleep mode, which can supply current for some or all of the control signal path circuitry. In some embodiments, the mode detector can be configured to be always alive. Accordingly, in some applications, it is desirable that DC current of the mode detector be extremely low to accommodate the sleep mode current design parameter.

In some embodiments, a very low power bandgap reference (e.g., Vbg~1.25V) can be implemented for the LDO regulator and regulated supply voltage (e.g., VintLogicReg~1.8V) for the mode detector. These two blocks preferably have very low current designs since they need to be always alive in some applications.

It is noted that to drive a switch having fast switching capability, good insertion loss (IL) and isolation (ISO) performance, moderate power level (e.g., in a SP3T configuration) handling capability, strong control signal drivers can be utilized. Such control signal drivers can be configured to handle high voltage level and driving capability, and/or a large field-effect transistor (FET) aspect ratio for sufficient dynamic current. With such performance demands, it can be challenging to control the leakage current from the large FETs.

In some embodiments, to support the example 1.2V to 5V control logic level, various functional blocks can be implemented in a controller having one or more features as described herein. For example, a block having level clippers can be implemented to protect input gates of the control signal path. A block with a logic level slicer can be implemented with, for example, sufficient noise margin to avoid logic decision error. A block with a logic decoder can be implemented to, for example, provide control logic decoding functionality. A block with level shifters can be implemented to, for example, convert lower control logic level to sufficient high voltage level to drive RF switches for good IL and ISO performance.

It is noted that without a bandgap and an LDO regulator, an ability to have a switching assembly be turned off in a sleep mode can require a relatively large area on a die for the control circuit and/or be inefficient (e.g., relatively large leakage current (e.g., possibly tens of μA DC current)). If an LDO regulator is used, a power down signal can be difficult to implement without a power down pin, and the power down signal level is not easily controlled if the desired supply voltage varies, for example, from 2.7V to 5.5V. Without use of an LDO regulator, voltage dividers can be implemented. However, since the supply voltage levels from these voltage dividers are less regulated, controllers using such voltage dividers typically suffer from issues such as poor PSRR (power supply rejection ratio) performance, supply voltage VDD-dependent output voltage, and being limited to quite narrow supply voltage range applications.

In the foregoing example of the voltage dividers, it is noted that to provide multiple less-regulated supply levels for level shifters and logic decoder, several voltage dividers powered directly by supply voltage VDD can be implemented in parallel. Such a configuration can introduce multiple DC current paths in an active mode and leakage paths in a sleep mode. Accordingly, such a configuration is generally not a low leakage design. Moreover, since these less-regulated supply voltages are generated separately and subject to suffering from different loading effect (e.g., voltage levels can vary with the loading currents), their actual voltage levels may not be predictable over PVT (process/voltage/temperature) variations, and may not be able to track some or all of such variations.

To achieve good IL (insertion loss) performance, RF switch drivers can be powered by VDD (e.g., battery voltage Vbatt) directly. However, such a configuration can limit the application of the RF switch to low supply voltage, since a supply voltage being too high (e.g., >3.7V) can cause device damage and/or reliability issues. Additionally, high quality power supply is typically required or desired since such an RF switch suffers from poor PSRR performance and is not able to operate well in noisy environment.

In some applications, two or three-step level shifting schemes can be used to convert, for example, 1.2V to 2.5V control logic levels up to 2.2V to 3.3V for a strong driver stage to drive RF switches. However, such a configuration can result in large leakages from the drivers and previous level shifters due to the bigger supply voltage difference between the driver stage and its previous stage than, for example, pFET threshold voltage Vp,th.

FIGS. 5-1, 5-2 and 5-3 show an example controller architecture 104 that can be configured to address some or all of the foregoing problems and issues. For example, to support a wide power supply range (e.g., VDD=2.7V to 5.5V) with reasonable PSRR performance, and a low leakage current (e.g., <200 nA when off, <650 nA when on), a voltage regulator such as an LDO regulator (154) can be implemented and configured to be able to be turned off in sleep mode, and to achieve low sleep mode current consumption.

Figures 1, 5:
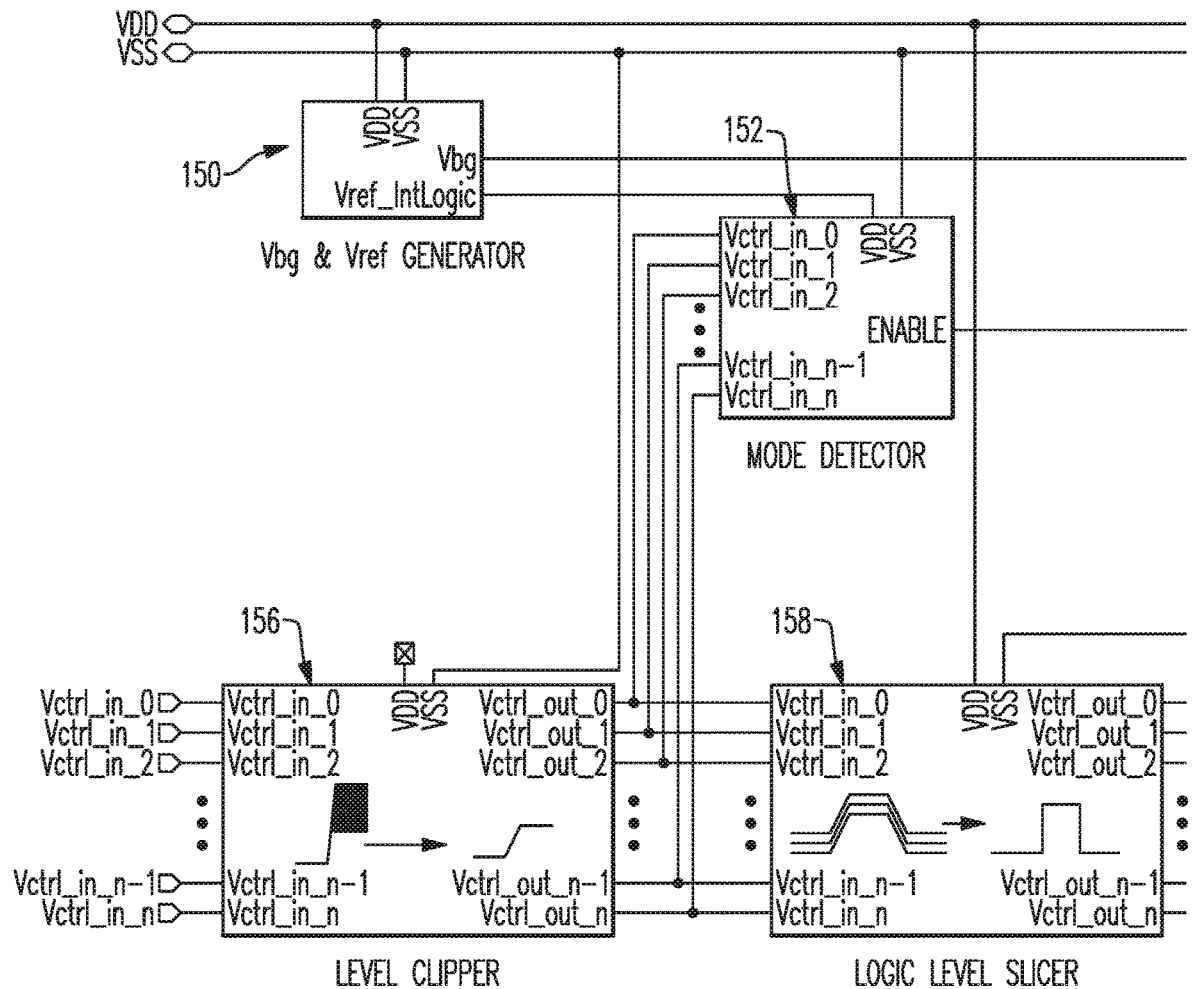
Figures 2, 5:
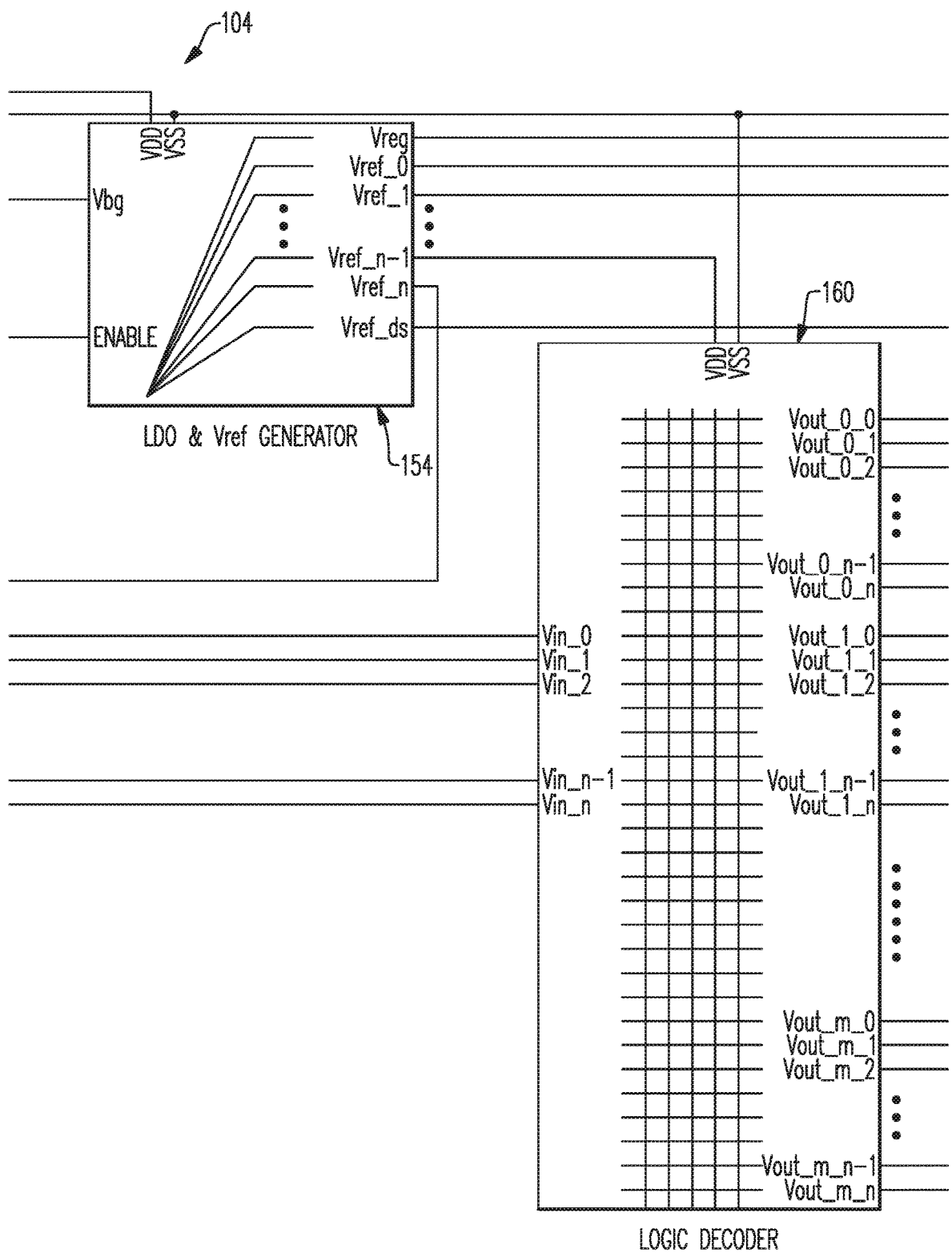
Figures 3, 5:
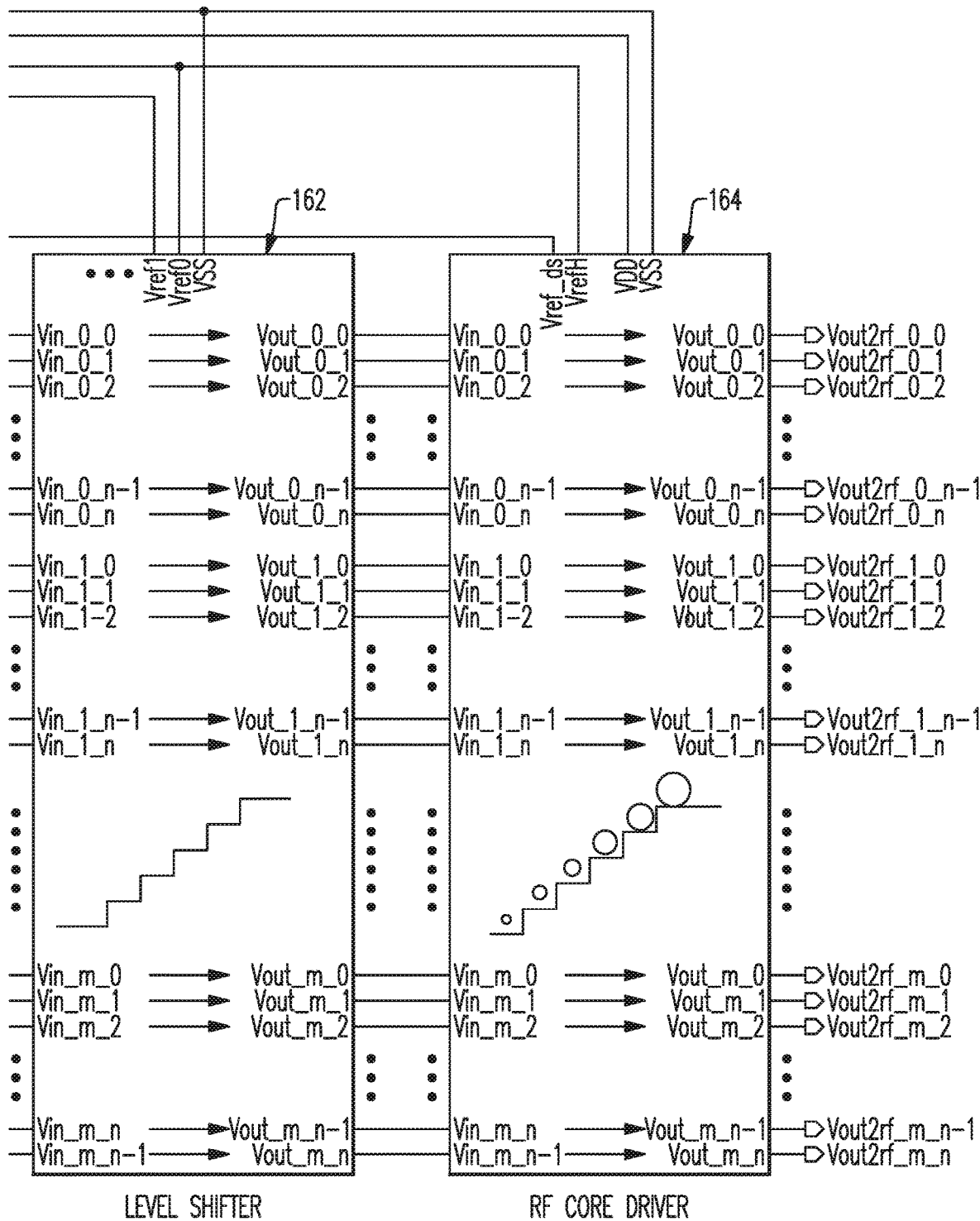

FIG. 5-1 shows that in some embodiments, a power down signal (e.g., as an output signal ENABLE) can be generated based on one or more input control signals (e.g., one or more of input control signals Vctrl_in_0, Vctrl_in_1, . . . , Vctrl_in_n) using a low DC current (e.g., <100 nA) mode detector 152 to power down the LDO regulator 154, which can supply current for all of the control signal path circuitry. In some embodiments, such a mode detector can be kept always alive, so that the operating mode change can be detected substantially immediately or sufficiently fast. More specifics examples related to the mode detector 152 and the LDO regulator 154 are described herein in greater detail.

FIG. 5-1 shows that in some embodiments, a very low power (e.g., <250 nA) bandgap and reference voltage generator 150 can be implemented to provide a bandgap voltage Vbg and a reference voltage Vref_IntLogic. For example, the bandgap voltage Vbg having a value of approximately 1.25V can be provided for the LDO regulator 154, and the reference voltage Vref_IntLogic can be provided for the mode detector 152 as a supply voltage (indicated as VDD). In some embodiments, the bandgap and reference voltage generator 150 can be configured to be always kept alive similar to the mode detector 152.

Figure 6:
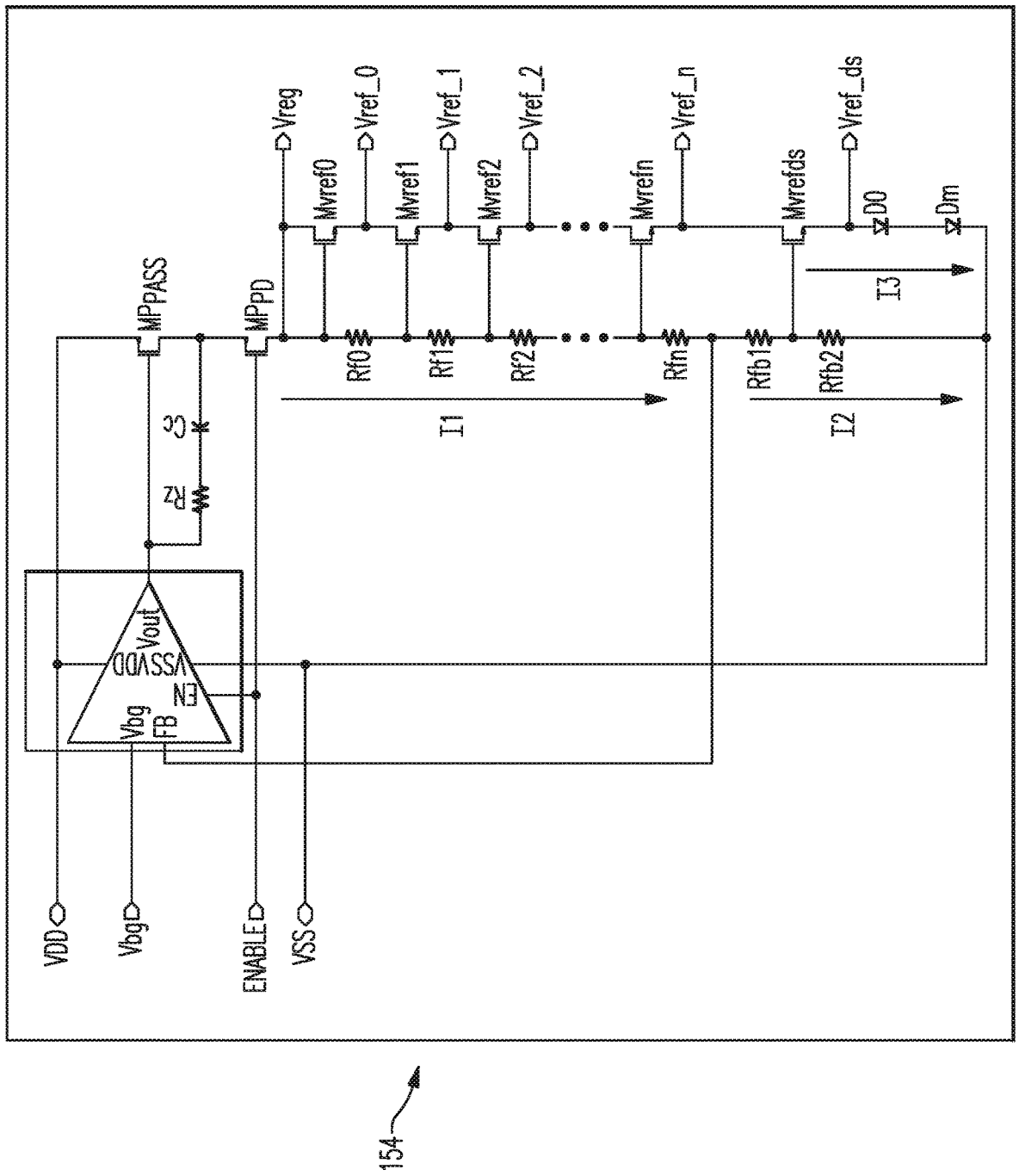
FIG. 6 shows an example of a low-dropout regulator that can be implemented in the controller architecture of FIGS. 5-1, 5-2 and 5-3.

FIG. 5-2 shows that in some embodiments, a plurality of regulated reference voltage levels can be generated by the LDO regulator 154. Such regulated reference voltage levels are depicted as Vreg, Vref_0 to Vref_n, and Vref_ds. Such regulated reference voltages can be provided to, for example, a level shifter (162 in FIG. 5-3), an RF core driver (164 in FIG. 5-3), a level slicer (158 in FIG. 5-1), and a logic decoder (160 in FIG. 5-2). FIG. 6 shows an example of how the LDO regulator 154 of FIG. 5 can be configured to provide such functionality.

FIG. 6 shows that in some embodiments, the LDO regulator 154 of FIG. 5 can include an error amplifier configured to receive the bandgap voltage Vbg from the bandgap and reference voltage generator (150 in FIG. 5-1) and a feedback voltage (FB), and generate an output voltage Vout. Operation of the error amplifier can be facilitated by the enable signal (ENABLE) from the mode detector (152 in FIG. 5-1) and supply voltage levels VDD and VSS.

Referring to FIG. 6, the output voltage Vout from the error amplifier is shown to be provided to a gate of a transistor MPpass having a source connected to the supply voltage VDD. A drain of MPpass is shown to be connected to a source of a second transistor MPpd having a gate provided with the ENABLE signal. The output of the error amplifier is shown to be coupled to the drain of MPpass through a resistance Rz and a capacitance Cc. Thus, one can see that a regulated voltage Vreg can be obtained from a drain of MPpd, and control and regulation of generation of such a regulated voltage Vreg can be achieved by Vout and ENABLE signals provided to MPpass and MPpd, respectively.

FIG. 6 shows that in some embodiments, a plurality of source followers (e.g., Mvref0, Mvref1, . . . , Mvrefn, Mvrefds) powered by the foregoing output Vreg can be implemented in series, thereby sharing a single DC current path from Vreg to ground. The source of each of the source followers is shown to provide a respective regulated reference voltage through a corresponding output node. For example, reference voltage outputs Vref_0, Vref_1, . . . , Vref_n, Vref_ds are shown to be provided at the sources of the source followers Mvref0, Mvref1, . . . , Mvrefn, Mvrefds, respectively.

In some embodiments, the source followers (Mvref0, Mvref1, . . . , Mvrefn, Mvrefds) can be turned on or off at the same time (e.g., off at the same time in a sleep mode). Moreover, since such regulated reference voltages are generated in series, they can track each other, so that the voltage difference(s) among them can be kept relatively constant.

Referring to FIG. 6, it is noted that the input voltage levels of the source followers can be provided by a resistor feedback network. Thus, the input voltage levels can be well regulated and generated without consuming any extra die size and DC current. Accordingly, a very compact design can be implemented by sharing a single DC current path and well-regulated reference voltages, which allows one to achieve one or more of the very low leakage current target, well-regulated supply levels, and good PSRR performance, without consuming extra die area and DC power. In the example of FIG. 6, the current through the path (I1 followed by I2) can be, for example, approximately 100 nA. A current I3 through diodes D0 and Dm at the source side or Mvrefds can be, for example, approximately 50 nA.

Referring to FIGS. 5 and 6, it is noted that to support the example range of 1.2V to 5V control logic level, the level clipper (156 in FIG. 5-1) can be configured to protect the input gates of the control signal path. The logic level slicer (158 in FIG. 5-1) can be configured to provide a sufficient noise margin to avoid logic decision error. The logic decoder (160 in FIG. 5-2) can be configured to provide control logic decoding. The level shifter (162 in FIG. 5-3) can be configured to convert lower control logic level to sufficient high voltage level to drive the RF switch for good IL and isolation performance. As described herein, such functional blocks can be powered by the well-regulated reference voltage levels from the LDO regulator (154 in FIGS. 5-2 and 6) with predictable low leakage currents.

Referring to FIGS. 5 and 6, it is noted that multiple-step level shifting schemes can be implemented to convert, for example, 1.2V to 5V control logic levels up to 2.7V to 5.5V for the driving stages (164 in FIG. 5-3) to drive the RF switches. It is further noted that such a configuration essentially only introduces predictable low leakage current from the drivers and previous level shifters, due to the much smaller supply voltage difference between the driver stage and its previous stage than pFET threshold voltage Vp,th.

Figure 7:
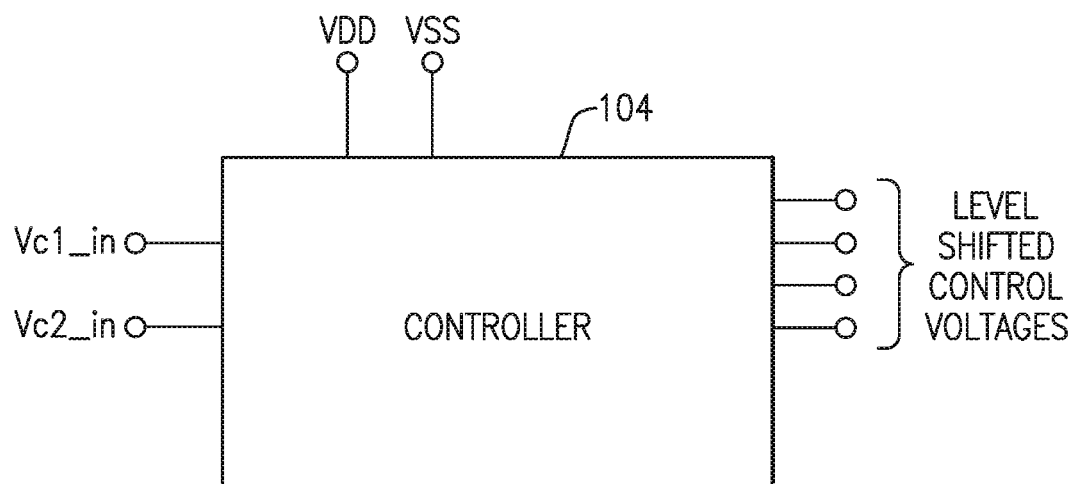
FIG. 7 shows a controller being provided with two example input control signals.
Figure 8A:
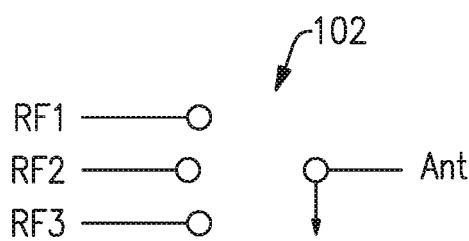
FIGS. 8A, 8B, 8C and 8D show example states of a single-pole-3-throw switch assembly.
Figure 8B:
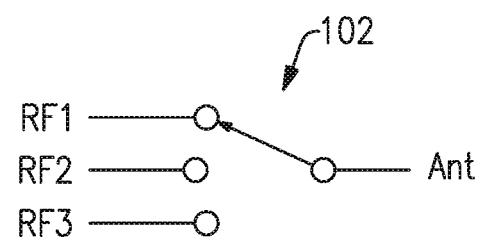
Figure 8C:
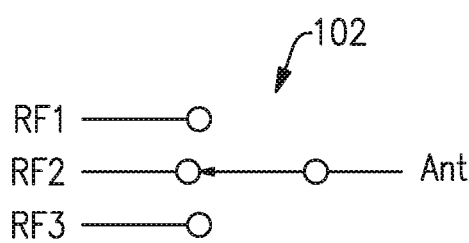
Figure 8D:
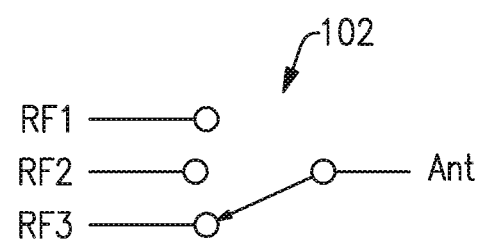

FIGS. 7-13 show more specific examples related to the foregoing examples described in reference to FIGS. 1-3, but in a more specific context of providing control for a SP3T switch utilizing a 2-bit control scheme. Thus, FIG. 7 shows a controller 104 being provided with input control signals Vc1_in and Vc2_in. As described herein, the controller can be provided with supply voltage levels VDD and VSS. Although the controller 104 is depicted as being provided with the two example input control signals, it will be understood that different numbers of input control signals can be accommodated by the controller 104.

In the example of FIG. 7, the controller 104 is shown to generate a plurality of level shifted control voltages. As described herein, such level shifted control voltages can be utilized to, for example, control operation of various FETs in a manner that provides desired performance levels.

In some embodiments, each of the input control signals Vc1_in and Vc2_in can be in a high level or a low level. For the purpose of description, such a high level can be a "1" state, and such a low level can be a "0" state. With such 2-bit control inputs, four states can be defined. For example, Table 1 lists the four states that can be assigned, in the context of four example switching states of an SP3T antenna switch 102 shown in FIGS. 8A-8D.

TABLE 1

| Vc1_in state | Vc2_in state | Switch state | Corresponding FIG. |
|---|---|---|---|
| 0 | 0 | All paths OFF | 8A |
| 1 | 0 | RF1 connected to Ant | 8B |
| 0 | 1 | RF2 connected to Ant | 8C |
| 1 | 1 | RF3 connected to Ant | 8D |

Figure 9:
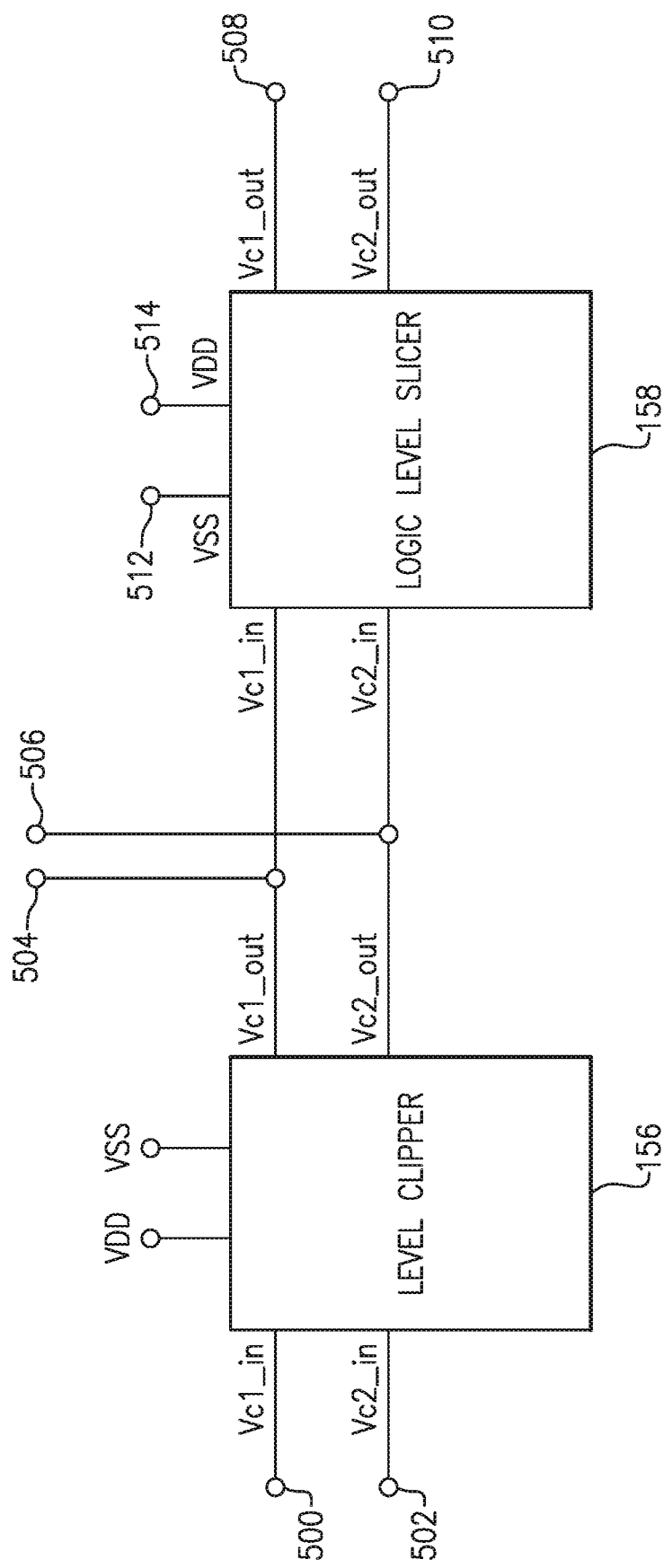
FIG. 9 shows the two input control signals of FIG. 7 being provided to a level clipper through control input nodes.

FIG. 9 shows the two input control signals Vc1_in and Vc2_in being provided to the level clipper 156 (e.g., level clipper 156 in FIG. 5-1) through control input nodes 500 and 502, respectively. Based on such input control signals, the level clipper provides corresponding clipped outputs Vc1_out and Vc2_out that are provided to the logic level slicer 158 (e.g., level clipper 158 in FIG. 5-1) as inputs Vc1_in and Vc2_in. The logic level slicer 158 is shown to generate corresponding level sliced outputs Vc1_out and Vc2_out at nodes 508 and 510, respectively. In some embodiments, the logic level slicer 158 can be provided with supply voltage levels VSS and VDD through nodes 512 and 514, respectively.

In the example of FIG. 9, the clipped outputs Vc1_out and Vc2_out from the level clipper 156 are also shown to be provided to nodes 504 and 506, respectively, for use by the mode detector. Examples related to use of such clipped control signals are described herein in greater detail in reference to FIG. 12.

Figure 10:
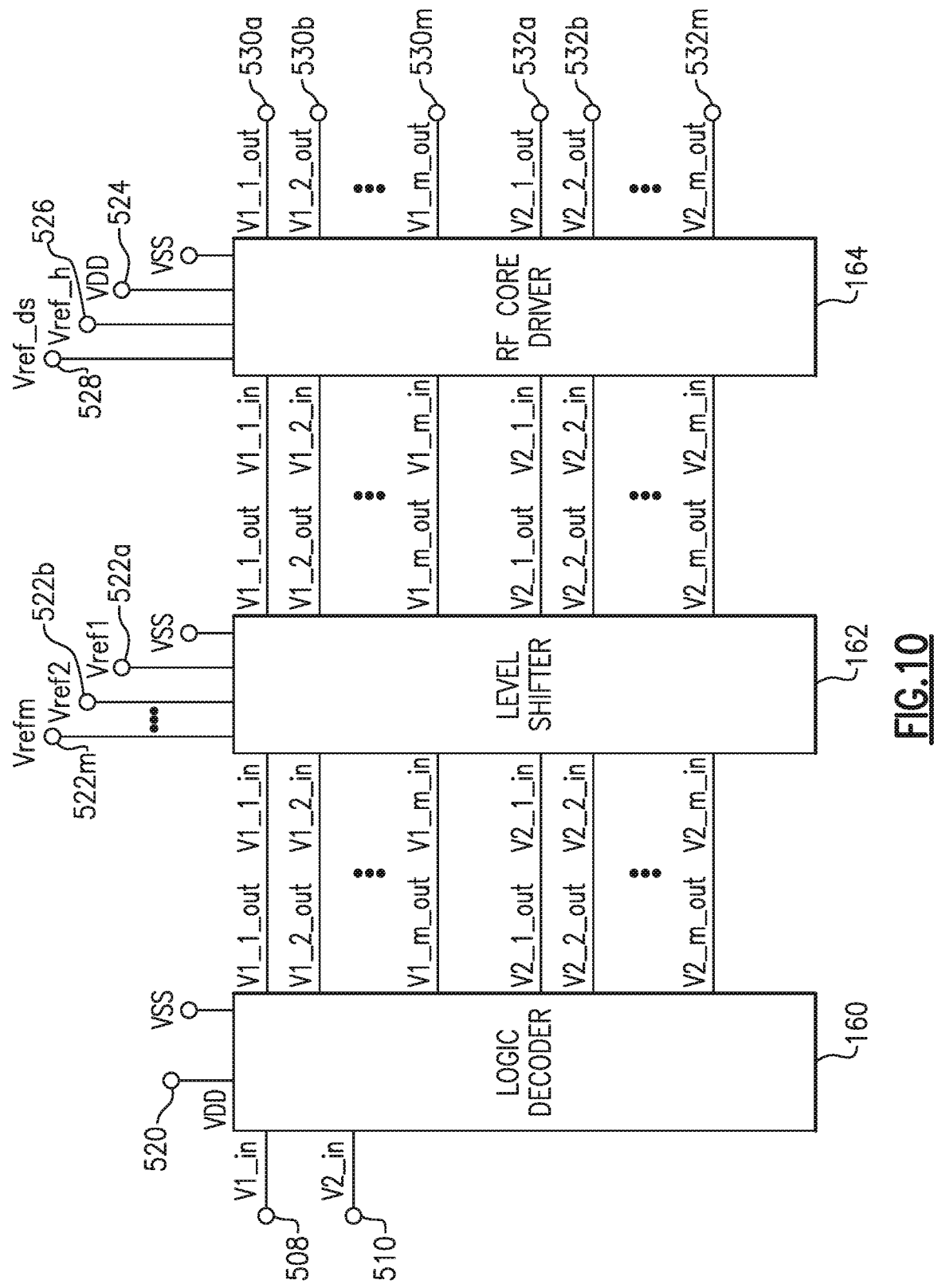
FIG. 10 shows an example progression of level sliced control signals provided from a logic level slicer of FIG. 9.

FIG. 10 shows an example progression of the level sliced control signals provided to the nodes 508 and 510 from the logic level slicer 158 in FIG. 9. In FIG. 10, the level sliced control signals are shown to be provided to the logic decoder 160 (e.g., logic decoder 160 in FIG. 5-2) as inputs V1_in and V2_in, from the corresponding nodes 508 and 510. The logic decoder 160 is shown to generate a plurality of outputs based on each of the inputs. For example, multiple outputs V1_1_out, V1_2_out, . . . , V1_m_out can be generated based on the first input V1_in. Similarly, multiple outputs V2_1_out, V2_2_out, . . . , V2_m_out can be generated based on the second input V2_in.

Referring to FIG. 10, such multiple outputs from the logic decoder 160 are shown to be provided to the level shifter 162 (e.g., level shifter 162 in FIG. 5-3) as inputs V1_1_in, V1_2_in, . . . , V1_m_in and V2_1_in, V2_2_in, . . . , V2_m_in. The level shifter 162 is shown to generate level shifted voltage outputs V1_1_out, V1_2_out, . . . , V1_m_out and V2_1_out, V2_2_out, . . . , V2_m_out based on the foregoing inputs. To generate such level shifted voltage outputs, the level shifter 162 is shown to be provided with multiple reference voltages Vref1, Vref2, . . . , Vrefm through respective nodes 522a, 522b, . . . , 522m. As described herein, such reference voltages can be generated by a voltage regulator such as an LDO regulator (e.g., 154 of FIG. 6). Additional examples related to generation of such reference voltages are described herein in greater detail in reference to FIG. 13.

Referring to FIG. 10, the multiple level shifted voltage outputs from the level shifter 162 are shown to be provided to the RF core driver 164 (e.g., RF core driver 164 in FIG. 5-3) as inputs V1_1_in, V1_2_in, . . . , V1_m_in and V2_1_in, V2_2_in, . . . , V2_m_in. The RF core driver 164 is shown to generate corresponding outputs V1_1_out, V1_2_out, . . . , V1_m_out and V2_1_out, V2_2_out, . . . , V2_m_out to be provided to the switch assembly (e.g., 102 in FIGS. 8A-8D). To generate such outputs, the RF core 164 is shown to be provided with a supply voltage VDD and reference voltages Vref_h, Vref_ds through respective nodes 524, 526 and 528. As described herein, such voltages can be generated by the LDO regulator 154 of FIG. 6. Additional examples related to generation of such voltages are described herein in greater detail in reference to FIG. 13.

Figure 11:
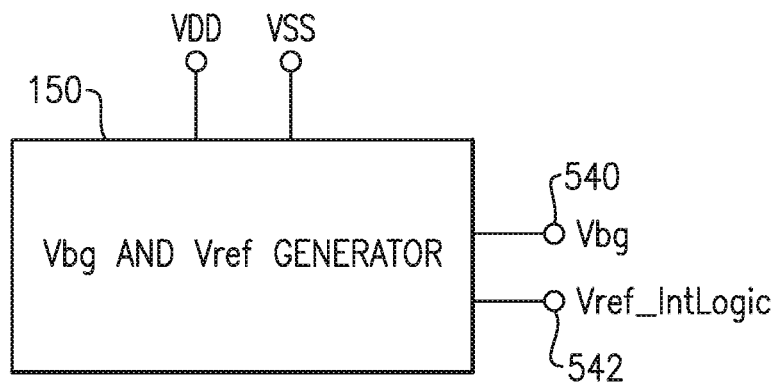
FIG. 11 shows a bandgap and reference voltage generator.

FIG. 11 shows a bandgap and reference voltage generator 150 that is similar to the bandgap and reference voltage generator 150 of FIG. 5-1. In the example of FIG. 11, however, the Vbg and Rref_IntLogic outputs are shown to be provided at output nodes 540 and 542, respectively.

Figure 12:
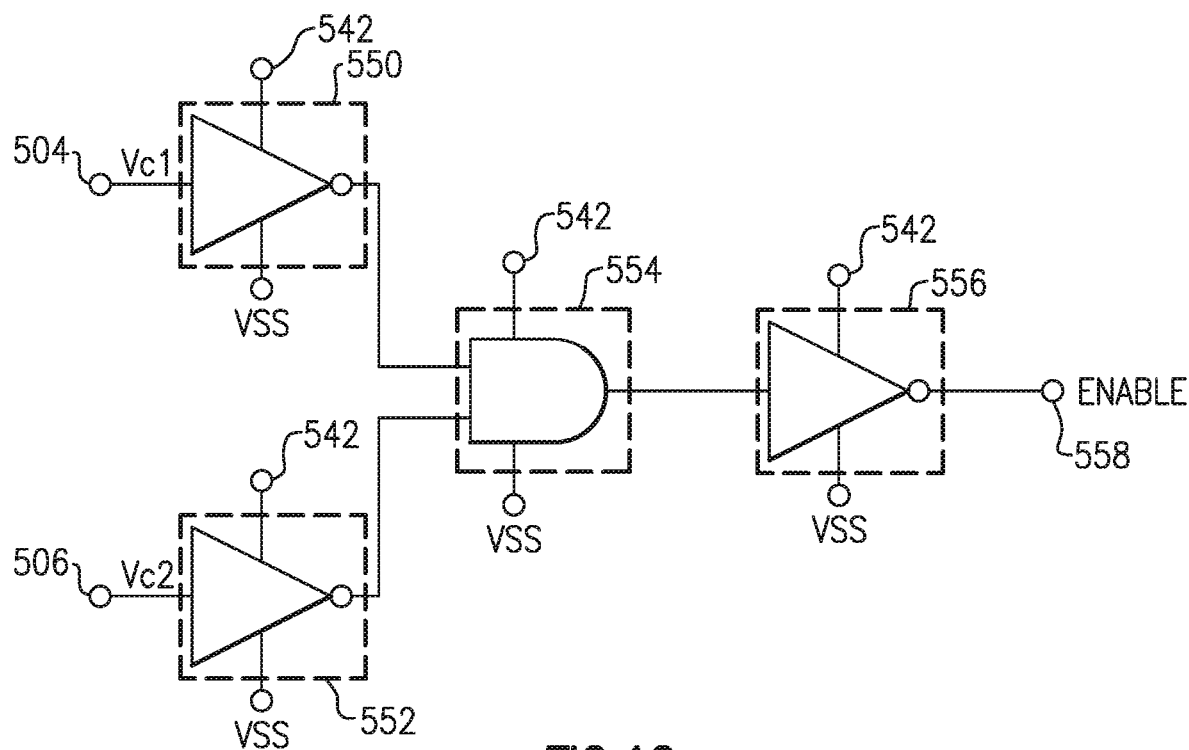
FIG. 12 shows a circuit that can be implemented as an example of the mode detector of FIG. 5-1.

FIG. 12 shows a circuit that can be implemented as an example of the mode detector 152 of FIG. 5-1. In the example of FIG. 12, such a circuit is described in the example context of the two input control signals (Vc1_in and Vc2_in in FIGS. 7 and 9). It will be understood that the circuit of FIG. 12 can be modified appropriately to accommodate other numbers of input control signals.

Referring to FIGS. 9 and 12, level clipped version of the two input control signals (Vc1_out and Vc2_out from the level clipper 156 in FIG. 9) can be provided to the mode detector of FIG. 12 through the nodes 504, 506 (as inputs Vc1 and Vc2 in FIG. 12). The first input control signal Vc1 is shown to be passed through a NOT gate 550, and the second input control signal Vc2 is shown to be passed through a NOT gate 552. Each of the first and second NOT gates 550, 550 is shown to be provided with a supply voltage through a node 542. In some embodiments, and referring to FIG. 11, such a supply voltage for the NOT gates (550, 552) of the mode detector can be provided by the Vref_IntLogic output of the bandgap and reference voltage generator 150.

Referring to FIG. 12, the outputs of the NOT gates 550, 552 are shown to be provided as inputs for an AND gate 554. The AND gate 554 is shown to be provided with a supply voltage through a node 542. In some embodiments, and referring to FIG. 11, such a supply voltage for the AND gate 554 of the mode detector can be provided by the Vref_Int-Logic output of the bandgap and reference voltage generator 150.

Referring to FIG. 12, the output of the AND gate 554 is shown to be provided as an input for a NOT gate 556. The NOT gate 556 is shown to be provided with a supply voltage through a node 542. In some embodiments, and referring to FIG. 11, such a supply voltage for the NOT gate 556 of the mode detector can be provided by the Vref_IntLogic output of the bandgap and reference voltage generator 150.

Referring to FIG. 12, the output of the NOT gate 556 is shown to be provided as an ENABLE signal at a node 558. As described herein, such an ENABLE signal can be utilized by a voltage regulator such as an LDO regulator to generate a plurality of reference voltage values, and to power down the LDO regulator in a sleep mode.

With the example logic circuit of FIG. 12, the combination of the two input signals Vc1 and Vc2 can have four states, as described herein in reference to Table 1. Table 2 lists such four states, and the resulting ENABLE output that can result from such inputs.

TABLE 2

| Vc1 state | Vc2 state | Output of the AND gate 554 | ENABLE state |
|---|---|---|---|
| 0 | 0 | 1 | 0 |
| 1 | 0 | 0 | 1 |
| 0 | 1 | 0 | 1 |
| 1 | 1 | 0 | 1 |

Accordingly, one can see that when Vc1 and Vc2 are both low (such that the switch assembly and the LDO regulator are to be OFF), the ENABLE signal can be in the 0 state (low state). In each of the remaining three states of the combinations of Vc1 and Vc2, at least one of Vc1 and Vc2 is high, and the corresponding throw is to be connected to the pole by an active switch arm. Thus, the ENABLE signal can be in the 1 state (high state) for each of such three states.

In the example logic circuit of FIG. 12, it is noted that by implementing the NOT gates 550, 552 at the inputs of the control signals (Vc1, Vc2), low current consumption can be achieved for the corresponding mode detector.

Figure 13:
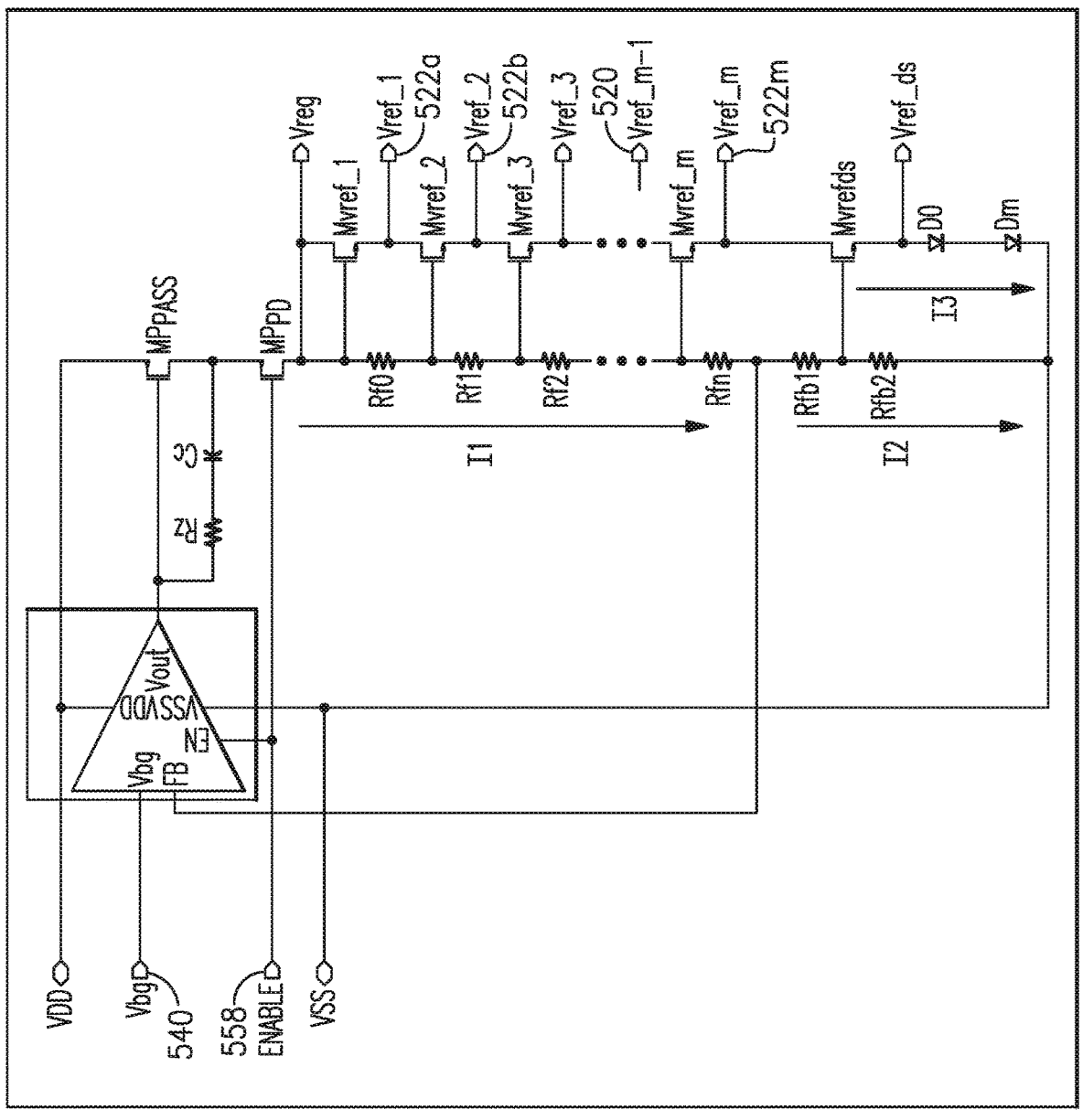
FIG. 13 shows a low-dropout regulator that is similar to the example of FIG. 6.

FIG. 13 shows an LDO regulator 154 that is similar to the LDO regulator 154 of FIG. 6. In the example of FIG. 13, however, the Vbg voltage from the bandgap and reference voltage generator 150 of FIG. 11 is shown to be provided as an input for the error amplifier through the node 540. Further, the ENABLE signal from the logic circuit of FIG. 12 is shown to be provided for the error amplifier and the transistor MPpd through the node 558.

In the example of FIG. 13, the LDO regulator 154 is shown to provide a plurality of regulated output voltages. Instead of such regulated output voltages being labeled as Vreg, Vref_0 to Vref_n and Vref_ds, the LDO regulator 154 of FIG. 13 is shown to output regulated voltages Vreg, Vref_1 to Vref_m and Vref_ds. That it, the LDO regulator 154 in FIG. 13 can output voltages that include m reference voltages (Vref_1 to Vref_m). As described herein, such reference voltages can be provided to the level shifter 162 of FIG. 10 through the nodes 522a, 522b, ..., 522m. In the example of FIG. 13, the corresponding source followers associated with the m reference voltages are indicated as Mvref_1, Mvref_2, ..., Mvref_m.

In some embodiments, one or more features associated with various examples of a controller as described herein can be implemented in a number of different ways and at different product levels. Some of such product implementations are described by way of examples.

Figure 14:
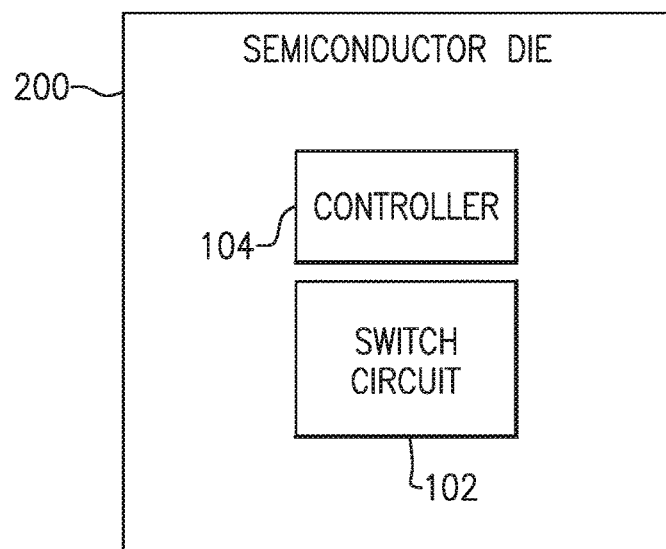
FIG. 14 shows that in some embodiments, a controller having one or more features as described herein can be implemented on a semiconductor die that also includes a switch circuit being controlled by the controller.

FIG. 14 shows that in some embodiments, a controller 104 having one or more features as described herein can be implemented on a semiconductor die 200 that also includes a switch circuit 102 being controlled by the controller 103. In some embodiments, the semiconductor die 200 can be configured to allow formation of silicon-on-insulator (SOI) switch devices.

In some embodiments, a switch controller having one or more features described herein can be implemented in a packaged module. An example of such a module is shown in FIG. 15.

Figure 15:
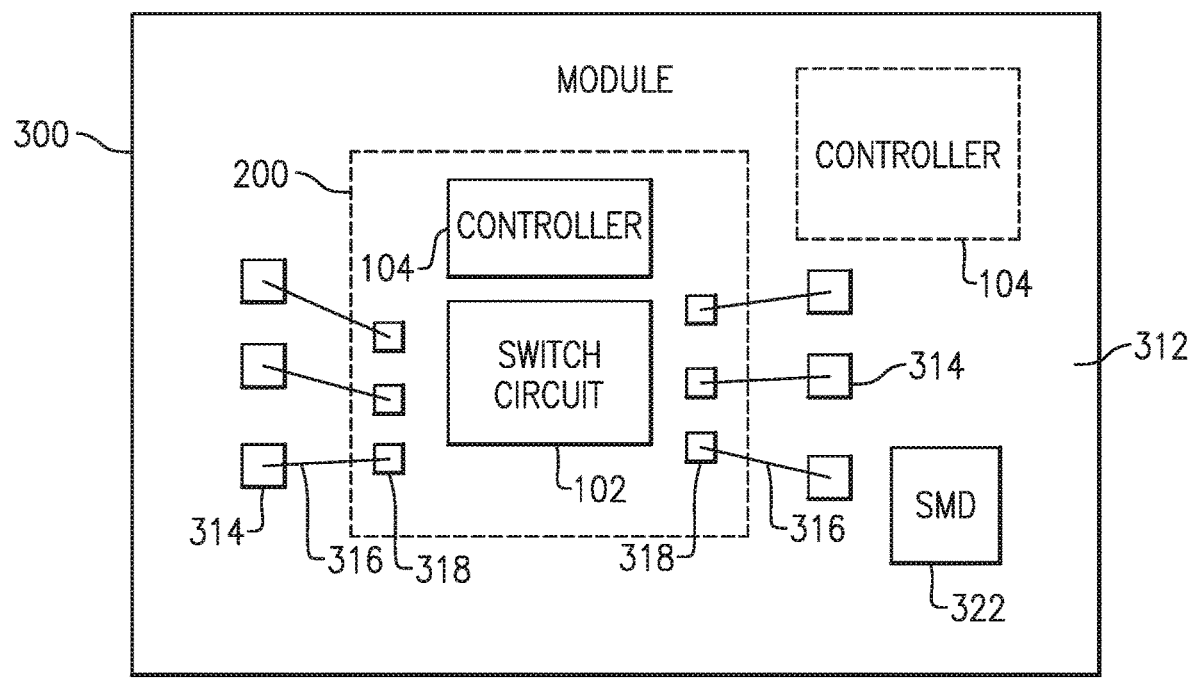
FIG. 15 shows that in some embodiments, a switch controller having one or more features described herein can be implemented in a packaged module.

In FIG. 15, a module 300 is shown to include a packaging substrate 312. Such a packaging substrate can be configured to receive a plurality of components, and can include, for example, a laminate substrate, a ceramic substrate, etc. The components mounted on the packaging substrate 312 can include one or more die. In the example shown, a die 200 having a switching circuit 102 is shown to be mounted on the packaging substrate 312. In some embodiments, at least some of a switch controller 104 having one or more features as described herein can be implemented on the same die (200) as the switching circuit 102, external to the die 200 (e.g., on one or more separate die depicted as 104), and any combination thereof.

The die 200 can be electrically connected to other parts of the module (and with each other where more than one die is utilized) through connections such as connection-wirebonds 316. Such connection-wirebonds can be formed between contact pads 318 formed on the die 200 and contact pads 314 formed on the packaging substrate 312. In some embodiments, one or more surface mounted devices (SMDs) 322 can be mounted on the packaging substrate 312 to facilitate various functionalities of the module 300.

In some embodiments, the packaging substrate 312 can include electrical connection paths for interconnecting the various components with each other and/or with contact pads for external connections. In some embodiments, a space above the packaging substrate 312 and the various components mounted thereon can be filled with an overmold structure. Such an overmold structure can provide a number of desirable functionalities, including protection for the components and wirebonds from external elements, and easier handling of the packaged module 300.

In some implementations, a device and/or a circuit having one or more features described herein can be included in an RF device such as a wireless device. Such a device and/or a circuit can be implemented directly in the wireless device, in a die form as described herein, in a modular form as described herein, or in some combination thereof. In some embodiments, such a wireless device can include, for example, a cellular phone, a smart-phone, a hand-held wireless device with or without phone functionality, a wireless tablet, etc.

Figure 16:
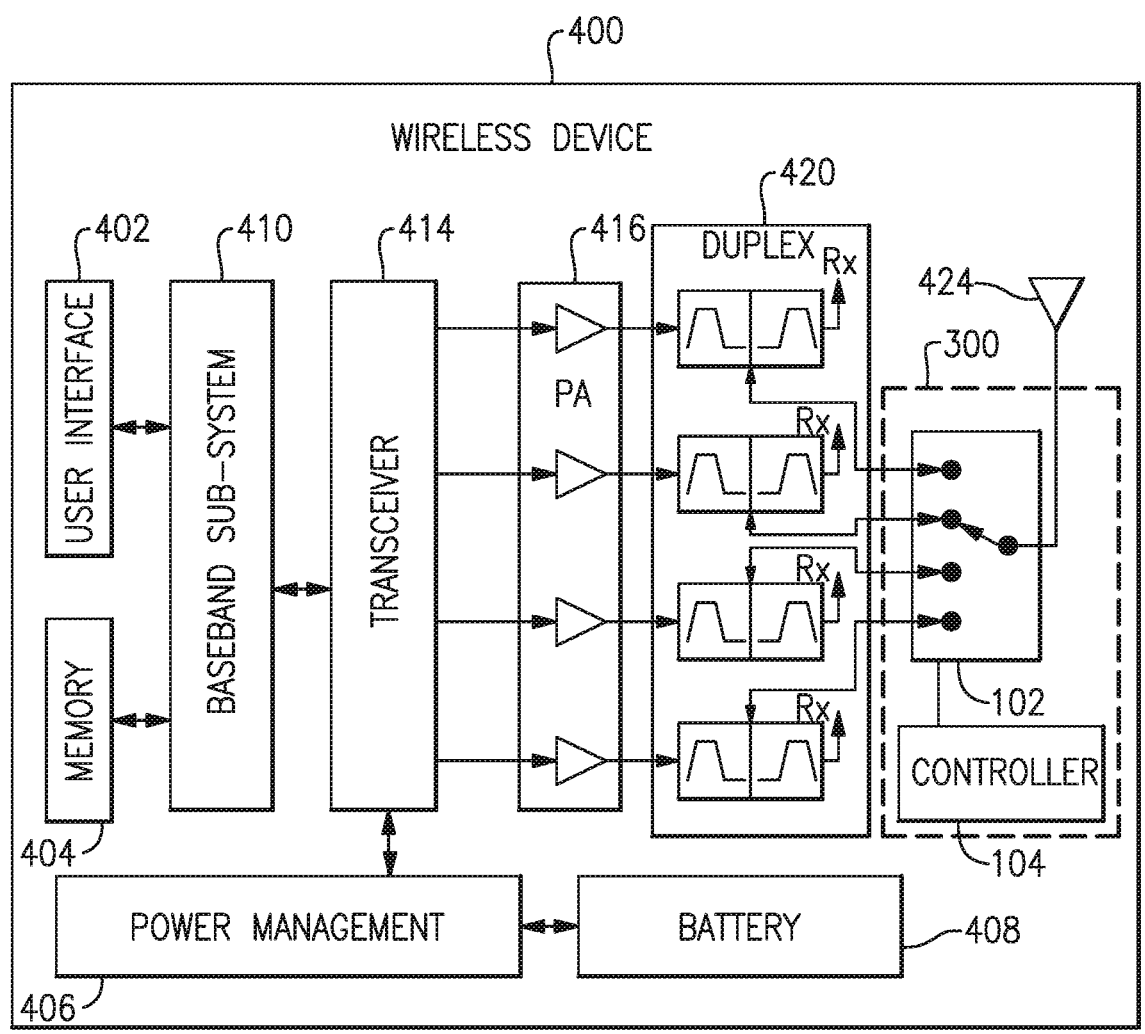
FIG. 16 depicts an example wireless device having one or more advantageous features described herein.

FIG. 16 depicts an example wireless device 400 having one or more advantageous features described herein. In the context of various switches and various biasing/coupling configurations as described herein, a switch 102 and a controller 104 can be part of a module 300 such as an antenna switch module. In some embodiments, such a switch module can facilitate, for example, multi-band multi-mode operation of the wireless device 400.

As also described herein, such a switch module can be configured to facilitate LAN operations of the wireless device 400. In the context of such LAN operations, the wireless device 400 may or may not have cellular functionality.

In the example wireless device 400, a power amplifier (PA) module 416 having a plurality of PAs can provide an amplified RF signal to the switch 102 (via a duplexer 420), and the switch 102 can route the amplified RF signal to an antenna 424. The PA module 416 can receive an unamplified RF signal from a transceiver 414 that can be configured and operated in known manners. The transceiver can also be configured to process received signals. The transceiver 414 is shown to interact with a baseband sub-system 410 that is configured to provide conversion between data and/or voice signals suitable for a user and RF signals suitable for the transceiver 414. The transceiver 414 is also shown to be connected to a power management component 406 that is configured to manage power for the operation of the wireless device 400. Such a power management component can also control operations of the baseband sub-system 410 and the module 300.

The baseband sub-system 410 is shown to be connected to a user interface 402 to facilitate various input and output of voice and/or data provided to and received from the user. The baseband sub-system 410 can also be connected to a memory 404 that is configured to store data and/or instructions to facilitate the operation of the wireless device, and/or to provide storage of information for the user.

In some embodiments, the duplexer 420 can allow transmit and receive operations to be performed simultaneously using a common antenna (e.g., 424). In FIG. 16, received signals are shown to be routed to "Rx" paths that can include, for example, one or more low-noise amplifiers (LNAs).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for controlling a radio-frequency switch, the method comprising:
   providing or generating a control signal to allow generation of a plurality of reference levels by a regulator, or to allow the regulator to be in sleep mode to conserve power, such that the control signal is received through a common input node of the regulator;
   operating an error amplifier of the regulator by the control signal to generate an output voltage based on inputs including a bandgap reference voltage and a feedback voltage;

controlling a gate of a first transistor of the regulator by the output voltage from the error amplifier, the first transistor having a source connected to a supply voltage, and controlling a gate of a second transistor of the regulator by the control signal, the second transistor having a source connected to a drain of the first transistor; and operating a mode detector to provide a first form of the control signal to the common input node to allow the plurality of reference levels to be generated by the regulator, or a second form of the control signal to the common input node to put the regulator in the sleep mode.

2. The method of claim 1 wherein the control signal is received through the common input node of the regulator and not through any dedicated power down pin to put the regulator into the sleep mode.

3. The method of claim 1 wherein the first form of the control signal includes an enable signal obtained from an enable pin.

4. The method of claim 3 wherein the second form of the control signal includes a disable signal that puts the regulator in the sleep mode.

5. The method of claim 1 wherein the operating of the mode detector includes keeping the mode detector always alive when operation of the radio-frequency switch is possible.

6. The method of claim 1 wherein the bandgap reference voltage is always available when operation of the radio-frequency switch is possible.

7. The method of claim 1 wherein the regulator includes a plurality of source followers implemented in series with one end connected to a drain of the second transistor and the other end coupled to ground, such that a source of each of the source followers provides a respective one of the plurality of reference voltage levels.

8. The method of claim 7 wherein the regulator further includes a resistor feedback network configured to provide input voltage levels for the source followers.

9. The method of claim 7 wherein the resistor feedback network is configured to share a single DC current path to achieve a low leakage current.

10. The method of claim 1 wherein the regulator is a low-dropout regulator.

11. A method for operating a wireless device, the method comprising:
operating a transceiver to process signals;
performing either or both of transmit operation and receive operation with the transceiver and one or more antennas; and
operating a switch to support the performing of either or both of the transmit and receive operations, the operating of the switch including providing or generating a control signal to allow generation of a plurality of reference levels by a regulator, or to allow the regulator to be in sleep mode to conserve power, such that the control signal is received through a common input node of the regulator, the operating of the switch further including operating an error amplifier of the regulator by the control signal to generate an output voltage based on inputs including a bandgap reference voltage and a feedback voltage, the operating of the switch further including controlling a gate of a first transistor of the regulator by the output voltage from the error amplifier, the first transistor having a source connected to a supply voltage, and controlling a gate of a second transistor of the regulator by the control signal, the second transistor having a source connected to a drain of the first transistor, the operating of the switch further including operating a mode detector to provide a first form of the control signal to the common input node to allow the plurality of reference levels to be generated by the regulator, or a second form of the control signal to the common input node to put the regulator in the sleep mode.

12. The method of claim 11 wherein the control signal is received through the common input node of the regulator and not through any dedicated power down pin to put the regulator into the sleep mode.

13. The method of claim 11 wherein the first form of the control signal includes an enable signal obtained from an enable pin.

14. The method of claim 13 wherein the second form of the control signal includes a disable signal that puts the regulator in the sleep mode.

15. The method of claim 11 wherein the operating of the mode detector includes keeping the mode detector always alive when operation of the switch is possible.

16. The method of claim 11 wherein the bandgap reference voltage is always available when operation of the switch is possible.

17. The method of claim 11 wherein the regulator is a low-dropout regulator.

18. The method of claim 11 wherein the operating of the transceiver to process signals includes processing of a wireless local area network signal.

19. The method of claim 11 wherein the operating of the transceiver to process signals includes processing of a cellular signal.

* * * * *